Figure 1:
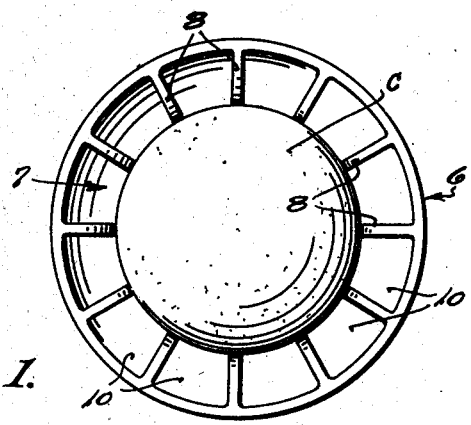

May 23, 1939.  W. H. FREDRICKSON  2,159,761

ICE CREAM SUNDAE

Filed Feb. 5, 1938

INVENTOR.
William H. Fredrickson
BY
ATTORNEY.

Patented May 23, 1939

2,159,761

UNITED STATES PATENT OFFICE 2,159,761

ICE CREAM SUNDAE

William H. Fredrickson, Seattle, Wash.

Application February 5, 1938, Serial No. 188,940

3 Claims. (Cl. 99—89)

This invention relates to ice cream cones and especially to improvements in the design of an edible receptacle for this purpose permitting application of syrup over an introduced scoop of ice cream to provide an ice cream "sundae".

It is my object to perfect a cone having the above end in view. Contemplating this and more particular objects and advantages, the nature of which will appear in the course of the following description and claims, the invention consists in the novel construction and peculiar adaptation of an ice cream receptacle hereinafter described and claimed.

Figure 2:
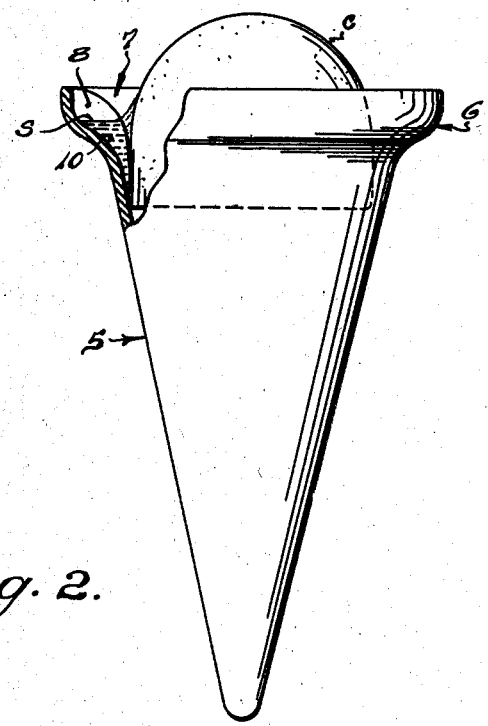

In the drawing:

Figure 1 is a top plan view of an ice cream receptacle formed according to the present invention and illustrating the application thereof; and Fig. 2 is an elevation of said receptacle with a portion broken away and shown in vertical section.

The invention is directed to that character of edible ice cream receptacle known as a "cone", a term which is used in referring to edible cups as well as to receptacles which in actuality are conical in form. The numeral 5 in the drawing denotes this cone portion of my invention, to which I add a somewhat flattish expanded ruff 6 acting to produce an annular gutter 7 divided by plural circumferentially spaced gill-like ribs 8 into multiple cells or pockets 10.

These ribs desirably slope downwardly from the lip of the ruff and project inwardly beyond the cone's perimetrical limits from where perpendicular prolongations merge with the wall of the cone below the shoulder of the ruff. In molding or otherwise forming the lower or cone portion of the receptacle it is important that the same be sufficiently expansive to permit the scoop of ice cream to pass the ribs and lodge in the cone below the lower termination of the ribs.

The manner in which the product is used is believed clear from the illustration showing a scoop of ice cream c and the syrup s which is poured over the same.

What I claim, is:

1. An edible container for use with a standard semi-spherical scoop of ice cream and syrup to provide an ice cream sundae and comprising a cake-dough product formed with a conical handle part and surmounted by a ruff-like enlargement provided interiorly at spaced intervals of the circumference with a plurality of radially disposed ribs, said product at the juncture of the conical base with the surmounting enlargement being of a diameter exceeding to a slight extent the diameter of the scoop of ice cream, the ribs extending slightly inwardly beyond the inner limits of the enlargement such that the circumference defined by the inner limits thereof approximates the outer perimeter of the scoop of ice cream, said inner extensions being prolonged downwardly to merge with the wall of the conical handle below the upper limits of the same.

2. The container defined in claim 1 wherein the inner profile of the ribs is convex in configuration to have the inner edge recede from the scoop of ice cream introduced to the container and thereby permit syrup to pass from one to an adjacent pocket over said receding edge.

3. An edible container for use with a semisphere of ice cream and syrup to provide an ice cream sundae and comprising a cake-dough product formed with a hollow handle part surmounted by a ruff-like enlargement provided interiorly at spaced intervals of the circumference with a plurality of radially disposed ribs, said product at the juncture of the handle part with the surmounting enlargement being of a diameter approximately that of the ice cream, the ribs having a convex inner-edge profile merging at the inner limits thereof with the wall of the handle part at the approximate juncture between the latter and the surmounting enlargement, the convexity of said ribs serving to minimize any tendency of the ice cream to become cocked as the same is introduced to the container and permitting communication for the passage of syrup between the adjacent pockets formed by the ribs.

WILLIAM H. FREDRICKSON.